United States Patent
Cirou et al.

(10) Patent No.: US 9,676,069 B2
(45) Date of Patent: *Jun. 13, 2017

(54) DEVICE FOR FILTRATION WITH A SET OF LEAST ONE FILTER CASSETTE

(71) Applicant: EMD Millipore Corporation, Billerica, MA (US)

(72) Inventors: Sebastien Cirou, Schiltigheim (FR); Jean-Louis Weissenbach, Ville (FR); Rene Reinbigler, Kirchheim (FR); Jean-Luc Beulay, Krautergersheim (FR); Frans Mels, Altenmarkt (AT); Cecile Delbos, Eschau (FR)

(73) Assignee: EMD Millipore Corporation, Billerica, MA (US)

( * ) Notice: Subject to any disclaimer, the term of this patent is extended or adjusted under 35 U.S.C. 154(b) by 347 days.

This patent is subject to a terminal disclaimer.

(21) Appl. No.: 14/311,399

(22) Filed: Jun. 23, 2014

(65) Prior Publication Data

US 2014/0299531 A1 Oct. 9, 2014

Related U.S. Application Data

(60) Continuation of application No. 13/950,646, filed on Jul. 25, 2013, now Pat. No. 8,883,003, which is a
(Continued)

(30) Foreign Application Priority Data

May 19, 2010 (FR) ...................................... 10 53875

(51) Int. Cl.
*B01D 25/12* (2006.01)
*B01D 25/127* (2006.01)
(Continued)

(52) U.S. Cl.
CPC ............ *B23P 19/04* (2013.01); *B01D 25/127* (2013.01); *B01D 25/14* (2013.01); *B01D 25/164* (2013.01);
(Continued)

(58) Field of Classification Search
None
See application file for complete search history.

(56) References Cited

U.S. PATENT DOCUMENTS

| 3,495,604 A | | 2/1970 | Trask, II | |
| 4,351,724 A | * | 9/1982 | Jones | B01D 25/19 100/199 |

(Continued)

FOREIGN PATENT DOCUMENTS

| AT | 293343 B | 10/1971 |
| CA | 1032480 A1 | 6/1978 |

(Continued)

OTHER PUBLICATIONS

Notice of Allowance mailed Sep. 15, 2014 in corresponding U.S. Appl. No. 13/106,250.
(Continued)

*Primary Examiner* — Benjamin Kurtz
(74) *Attorney, Agent, or Firm* — Nields, Lemack & Frame, LLC

(57) ABSTRACT

The invention concerns a filtration device comprising a manifold providing fluid connection and mechanical connection comprising a clamping plate movably mounted relative to the manifold and adapted to compress at least one cassette against the manifold, means for driving and guiding the clamping plate comprising a rod extending between the manifold and the plate, an actuator provided with a body and a member moveable relative to the body, which member is adapted to move through a predetermined travel between an
(Continued)

extended position and a retracted position, the body being carried by the manifold, and the member carrying the rod and driving the plate via the rod to a clamped position in which the member is in an intermediate retracted position in which it has moved through a shorter travel than the predetermined travel relative to its extended position.

10 Claims, 3 Drawing Sheets

Related U.S. Application Data division of application No. 13/106,250, filed on May 12, 2011, now Pat. No. 8,877,052.

(51) Int. Cl.

| | | |
|---|---|---|
| *B01D 25/164* | (2006.01) | |
| *B01D 61/18* | (2006.01) | |
| *B01D 61/20* | (2006.01) | |
| *B01D 63/08* | (2006.01) | |
| *B23P 19/04* | (2006.01) | |
| *B01D 25/19* | (2006.01) | |

(52) U.S. Cl.
CPC ............ *B01D 25/19* (2013.01); *B01D 61/18* (2013.01); *B01D 61/20* (2013.01); *B01D 63/082* (2013.01); *B01D 2313/02* (2013.01); *B01D 2313/06* (2013.01); *B01D 2313/105* (2013.01); *B01D 2313/125* (2013.01); *Y10T 29/49826* (2015.01)

(56) References Cited

U.S. PATENT DOCUMENTS

| | | | | |
|---|---|---|---|---|
| 4,855,062 | A | 8/1989 | Oelbermann | |
| 5,096,582 | A | 3/1992 | Lombardi et al. | |
| 5,599,447 | A | 2/1997 | Pearl et al. | |
| 6,506,300 | B2 | 1/2003 | Kuss et al. | |
| 7,306,727 | B2 | 12/2007 | Perreault | |
| 8,701,704 | B2 | 4/2014 | Cirou et al. | |
| 8,877,052 | B2 * | 11/2014 | Cirou ................ | B01D 61/18 210/224 |
| 8,883,003 | B2 * | 11/2014 | Cirou ................ | B01D 61/18 210/224 |
| 2005/0199559 | A1 | 9/2005 | Duby | |
| 2007/0113907 | A1 | 5/2007 | Brennen et al. | |
| 2007/0132231 | A1 | 6/2007 | Tokuda et al. | |
| 2008/0135468 | A1 * | 6/2008 | Gagnon .............. | B01D 63/082 210/232 |
| 2008/0135499 | A1 * | 6/2008 | Gagnon .............. | B01D 63/08 210/767 |
| 2008/0135500 | A1 | 6/2008 | Gagnon et al. | |
| 2012/0111782 | A1 | 5/2012 | Cirou et al. | |
| 2012/0174996 | A1 | 7/2012 | Cirou et al. | |
| 2013/0306539 | A1 | 11/2013 | Cirou et al. | |
| 2014/0299530 | A1 * | 10/2014 | Cirou ................ | B01D 61/18 210/230 |
| 2015/0020366 | A1 | 1/2015 | Cirou et al. | |

FOREIGN PATENT DOCUMENTS

| | | |
|---|---|---|
| CN | 101284193 A | 10/2008 |
| CN | 101287530 A | 10/2008 |
| DE | 37 08 734 A1 | 10/1987 |
| DE | 10 2006 009804 A1 | 9/2007 |
| EP | 0265794 A2 | 5/1988 |
| EP | 0498211 B1 | 11/1996 |
| EP | 1258282 A2 | 11/2002 |
| EP | 1946825 A1 | 7/2008 |
| WO | 2004/043577 A1 | 5/2004 |
| WO | 2004-113235 A1 | 12/2004 |

OTHER PUBLICATIONS

Notice of Allowance mailed Sep. 15, 2014 in corresponding U.S. Appl. No. 13/950,646.
French Search Report dated Nov. 25, 2010 in corresponding foreign application FR 1053875.
Extended European Search Report mailed Sep. 29, 2011 in corresponding European Patent Application No. EP 11290230.9.
French Search Report dated Nov. 25, 2010 in co-pending foreign application FR 1053880.
Chinese communication, with English translation, dated Oct. 25, 2013 in corresponding Chinese patent application No. 201110133096.5.
Chinese communication, with English translation, dated Apr. 9, 2014 in corresponding Chinese patent application No. 201110133096.5.
Office Action—Restriction—mailed Feb. 13, 2013 in corresponding U.S. Appl. No. 13/106,250.
Office Action mailed Mar. 19, 2013 in corresponding U.S. Appl. No. 13/106,250.
Final Rejection mailed Jun. 26, 2013 in corresponding U.S. Appl. No. 13/106,250.
Notice of Allowance mailed Jul. 17, 2013 in corresponding U.S. Appl. No. 13/106,250.
Notice of Allowance mailed Sep. 18, 2013 in corresponding U.S. Appl. No. 13/106,250.
Office Action mailed Dec. 24, 2013 in corresponding U.S. Appl. No. 13/106,250.
Final Rejection mailed Mar. 26, 2014 in corresponding U.S. Appl. No. 13/106,250.
Office Action mailed Dec. 27, 2013 in corresponding U.S. Appl. No. 13/950,646.
Final Rejection mailed Mar. 26, 2014 in corresponding U.S. Appl. No. 13/950,646.
Office action mailed Aug. 8, 2016 in co-pending U.S. Appl. No. 14/311,395.
Office action mailed Aug. 10, 2016 in co-pending U.S. Appl. No. 14/506,946.
Notice of Allowance mailed Nov. 30, 2016 in co-pending U.S. Appl. No. 14/311,395.
Notice of Allowance mailed Dec. 14, 2016 in co-pending U.S. Appl. No. 14/506,946.

\* cited by examiner

DEVICE FOR FILTRATION WITH A SET OF LEAST ONE FILTER CASSETTE

This application is a continuation of U.S. Ser. No. 13/950,846 filed Jul. 25, 2013, now U.S. Pat. No. 8,883,003, which is a divisional of U.S. Ser. No. 13/106,250 filed May 12, 2011, now U.S. Pat. No. 8,877,052, which claims priority of French application No. 1053875 filed May 19, 2010, the disclosures of which are hereby incorporated by reference.

The invention concerns devices for filtration of a liquid with a set of at least one filter cassette, which liquid is for example a biological liquid, and particularly but not exclusively a biopharmaceutical liquid.

Patent EP 0 498 211 describes a filtration device which comprises a manifold providing fluid connection and mechanical connection, a clamping plate, four rods along each of which the clamping plate slides, a set of at least one filter cassette disposed between the manifold and the clamping plate and means for clamping and locking to compress the set of filter cassettes between that manifold and that plate.

The manifold comprises a flow inlet for a fluid to treat, a filtrate flow outlet for a treated fluid termed filtrate, retentate flow outlet for a treated fluid termed retentate and a conveying network for the fluids to treat and the treated fluids. This manifold furthermore has a bearing surface through which emerge ports communicating with the conveying network and communicating with conduits formed in the filter cassette abutting the bearing surface.

Each rod emerges from the bearing surface of the manifold and extends towards the clamping plate.

The clamping plate is movably mounted on the rods, via four through holes each formed substantially at a corner of that plate and each receiving a respective rod.

Each rod is threaded and four nuts are each screwed onto a respective rod to form the clamping and locking means.

The nuts are screwed onto the rods to clamp the plate against the set of cassette to reach a final position in which the set of filter cassettes is sufficiently compressed between the clamping plate and the manifold.

A drawback of this device is that the clamping of the set of filter cassettes is performed by hand.

A known solution to overcome this drawback is a filtration device which comprises, in place of the threaded rods, notched rods, and, instead of the nuts, hydraulic actuators and locking rings.

Each actuator comprises a body and a member that is moveable relative to the body, which moveable member has an extended position and a retracted position in which said moveable member has moved through a predetermined travel relative to its extended position.

These actuators are of single-acting or double-acting jack type, and the movement of the moveable member relative to the body is achieved by urging that moveable member in known manner.

Each actuator comprises its body which is fastened to the clamping plate and its moveable member which is mechanically linked to the notched rod, which rod extends between the clamping plate and the manifold where it is received through an aperture formed in that manifold.

Each locking ring is adapted to be engaged with a notch of a respective rod.

The first step consists of advancing the clamping plate (and the actuator) from its starting position to the intermediate position in which the set of filter cassettes is not yet compressed, with the respective notched rod sliding through the aperture of the manifold.

The second step consists of connecting the rod and the manifold by the mounting of the locking ring, which is split, on one of the notches of the rod to lock the rod relative to the manifold.

This split ring is mounted on the opposite side of the manifold to the side of the manifold facing which is the clamping plate.

The third step corresponding to fine clamping consists of urging the moveable member hydraulically to make it pass from its extended position to its intermediate retracted position in which the moveable member has moved through a shorter travel than the predetermined travel relative to its extended position. As the moveable member is fixed to the notched rod, itself fixed to the manifold which is fixed, the clamping plate is consequently pushed by the body of the actuator to its final position.

A drawback of the known device with actuators is that the arrangement of those actuators increases the bulk of the device.

The invention aims to provide device for filtration with assisted clamping of the set of at least one filter cassette, which is simple, economical, convenient.

For this, according to a first aspect, the invention concerns a device for filtration with a set of least one filter cassette comprising:

a manifold providing fluid connection and mechanical connection comprising at least one flow inlet for a fluid to treat, at least one flow outlet for a treated fluid and a network for conveying said fluid to treat and said treated fluid, said manifold having a bearing surface for a said filter cassette, through which bearing surface emerge cassette feed ports and cassette return ports communicating with said conveying network, which cassette feed ports and cassette return ports are configured to communicate with conduits formed in a said filter cassette bearing against said bearing surface;

a clamping plate; and means for driving and guiding said clamping plate parallel to and facing said bearing surface, that are formed by at least one rod which extends between said manifold and said clamping plate and by at least one actuator, which is provided with a body and a member moveable relative to said body, which moveable member has an extended position and a retracted position in which said moveable member has been moved through a predetermined travel relative to its extended position, by virtue of which the clamping plate has a starting position in which said plate is away from said set of at least one filter cassette and a clamped position in which said plate is approached and compresses said set of at least one filter cassette against said manifold;

said body is carried by said manifold; said moveable member carries said rod; and said actuator, said rod and said clamping plate are configured such that said actuator drives said clamping plate via said rod to its clamped position in which said moveable member is in an intermediate retracted position in which said moveable member has moved through a shorter travel than said predetermined travel relative to its extended position.

Thus, in the device according to the invention, it is the manifold (and not the clamping plate) which carries the body of the actuator.

By virtue of this arrangement, there is no actuator body projecting from the clamping plate on the opposite side to the rod. This for example enables the device according to the invention to be more compact, particularly, but not exclusively, if the extent of the actuator body in terms of length superposes, at least partially, over the extent of the manifold in terms of thickness.

Furthermore, with this arrangement, there is no difficulty in uncoupling the clamping plate and the rod, which makes it possible for example to dispose that clamping plate in a position other than parallel to and facing the bearing surface of the manifold, improving the accessibility to the reception zone for the cassettes.

What is more, the proximal (and not distal) position of the actuator favors the installation of its supply conduits.

According to a particularly simple, convenient and economical feature, said rod and said clamping plate are configured such that said clamping plate can be selectively positioned along said rod.

Thus, the clamping plate is first of all moved from its starting position to an intermediate position in which it is in non-clamping abutment against the set of filter cassettes, and is then driven by the moveable member to its final position.

According another particularly simple, convenient and economical feature, the device comprises two said actuators and two said rods, said rods being received by said clamping plate in two diagonally opposite zones of that clamping plate.

Thus, the force exerted by the clamping means on the clamping plate, and consequently on the filter cassettes, is distributed optimally over the whole surface of that plate and thus over the whole surface of the cassettes.

According to preferred, simple, convenient and economical features of the device according to the invention:

the body of the actuator is directly fastened to the manifold; and optionally the manifold comprises two bearing surfaces arranged on respective opposite sides of said manifold, and two clamping plates each facing a respective bearing surface, and said clamping means comprise at least one said actuator and at least one said rod for moving each said clamping plate.

By virtue of the arrangement of the clamping means, and in particular of each actuator which is carried by the manifold, it is possible to place a set of filter cassettes on respective opposite sides of the manifold providing fluid connection and mechanical connection and to clamp them against respective bearing surfaces of that manifold, without however increasing the bulk of the device.

To be precise, it is possible to mount several actuators at the location of the manifold providing fluid connection, which actuators respectively act on one side and on the other of the manifold providing fluid connection and mechanical connection so as to respectively approach towards each other the clamping plates disposed on respective opposite sides of the manifold.

Thus, it is possible to greatly increase the biological treatment area simply, conveniently and economically.

Of course, to increase the filtration area it is also possible to superpose the filtration devices, with their inlets and outlets in communication. Care will then be taken to ensure sealing between two superposed filtration devices.

It will thus be possible to have a treatment installation comprising at least one filtration device as described above, with filter cassettes over at least one side of each of the filtration devices.

It is thus possible for a user of that installation to adapt the filtration area of each filtration device depending on the treatment to perform, simply, conveniently and economically.

Alternatively, according to other features preferred for the same reasons:

said body of the actuator is movably mounted in a sleeve fixed to said manifold; and optionally said manifold comprises two bearing surfaces arranged on respective opposite sides of said manifold, and two clamping plates each facing a respective bearing surface, the clamping means comprise at least one said actuator, at least one said rod linked to one of the two said clamping plates, at least one additional rod extending between said body of said actuator and the other of the two said clamping plates, said additional rod being carried by a first end by said body and, by a second end that is an opposite end to the first end, carrying the other of the two said clamping plates.

Thus, the same actuator serves to drive both the rod and the additional rod situated on the opposite side.

According to another preferred feature, said rod comprises a plurality of notches over its length.

The spacing of the notches on the rod may be regular or not. The length of the notches depends on the type of filter cassette used with the holding device. Furthermore, the length and the spacing of the notches depends on the travel of the jack, on the type and on the number of cassettes, and on the degree of compression allowable for each cassette, which is approximately 10% of its thickness. The values corresponding to the length of the notches and their spacing are determined in order for the distribution of the fluid to be even in the filter cassettes. As to the number of cassettes, this corresponds to the filtration area that it is possible to have over at least one side of the filtration device. This filtration area may range from approximately 1 m$^2$ to 10 m$^2$, and in particular from 2.5 m$^2$ à 7.5 m$^2$. From one side of the filtration device, there will preferably be available approximately 5 m$^2$ of filtration area formed by one or more filter cassettes.

According to other preferred, simple, convenient and economical features of the device according to the invention:

said device comprises a member for locking said clamping plate onto a notch of said rod;

said device comprises at least one rod for holding and guiding said set of at least one filter cassette which is carried by said manifold and which extends through at least one aperture formed in said clamping plate;

said device comprises at least one rod for supporting said clamping plate which is carried by said manifold; and/or said device comprises means for mounting said clamping plate on said supporting rod comprising a slide and a hinge, by virtue of which said clamping plate is slidingly moveable along the supporting rod and has a working configuration in which it is raised parallel to and facing said bearing surface and a stored configuration in which it is folded down and clear of said rod.

The disclosure of the invention will now be continued with the description of embodiments, given below by way of illustrative and non-limiting example, with reference to the accompanying drawings, in which.

Figure 1:
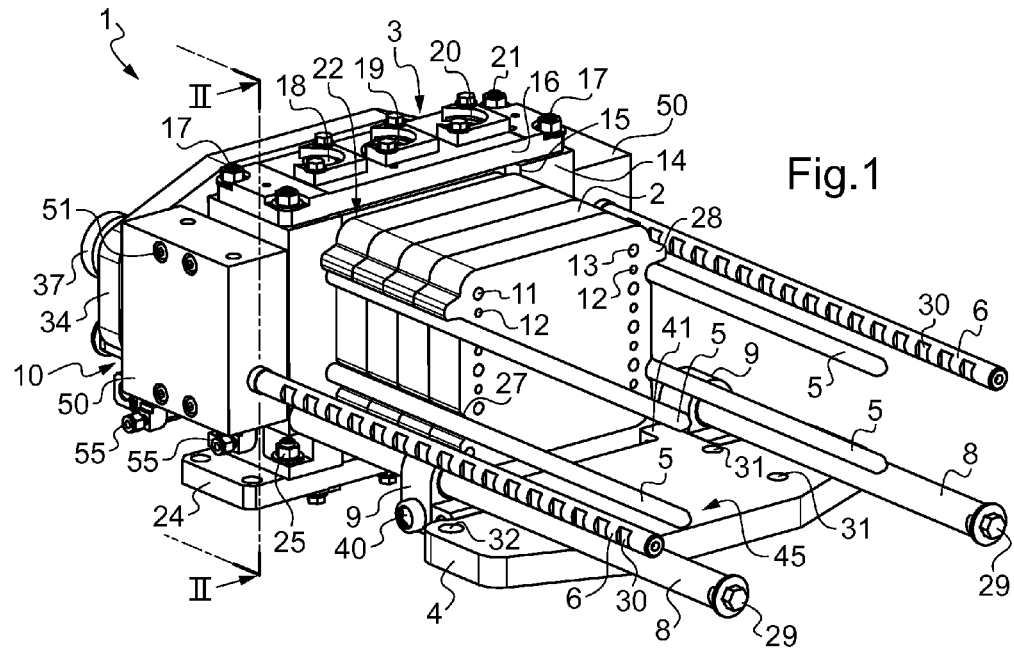
FIG. 1 is a perspective view of a filtration device according to a first embodiment of the invention, with a clamping plate in stored configuration.

FIG. 1 illustrates a device for filtration 1 with filter cassettes 2 comprising a manifold 3 providing fluid connection and mechanical connection, a clamping plate 4 provided on a first side of the manifold 3 to clamp the set of filter cassettes 2 between the manifold 3 and that plate 4, and another clamping plate 34 provided on a second side of the manifold 3 that is an opposite side to the first side to clamp a dummy cassette 26 (FIG. 4), means for driving each plate 4, 34 that are formed by notched rods 6, 36 carried by actuators 10 (FIG. 2), each plate 4, 34 being disposed, in working configuration (FIGS. 3 and 4), parallel to and facing a respective bearing surface of the manifold 3, and being mounted on the respective rods 6, 36.

Figure 4:
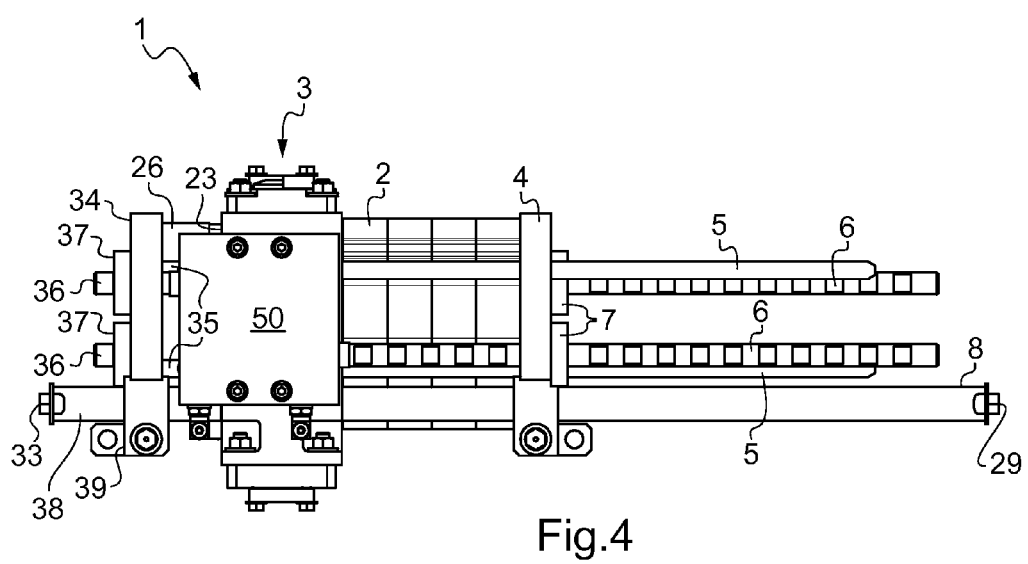
FIG. 4 is a side view of the device, with the clamping plate in clamped position.

Locking members 7, 37 are mounted on the notched rods 6, 36 to prevent the plate 4, 34 from moving in an opposite direction to the set of cassettes 2 (FIG. 4).

Figure 3:
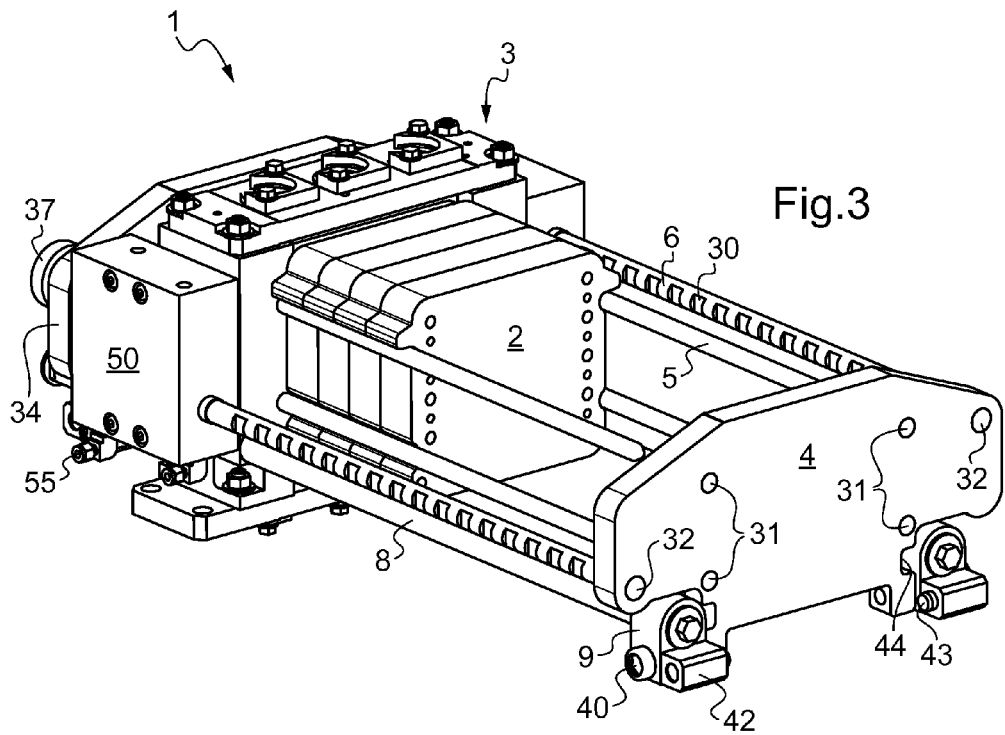
FIG. 3 is a similar view to FIG. 1, with the clamping plate in starting position in which it is not yet clamped against the filter cassettes.

Device 1 further comprises on each side of the manifold 3 rods 8, 38 for supporting the respective clamping plates 4, 34 and means 9, 39 for mounting the respective plates 4, 34 to make them slide and to make them pass from a storage configuration (FIG. 1) to a working configuration (FIGS. 3 and 4).

The device 1 further comprises on each side of the manifold 3 rods 5, 35 for holding and guiding respectively the filter cassettes 2 and the dummy cassette 26.

In the example described, the device 1 forms part of an installation for treatment by tangential filtration.

In tangential filtration, a fluid to treat enters the cassette 2 by a feed conduit 11 (FIG. 13), a first fraction of the fluid termed retentate flows tangentially to a membrane (not shown) of each cassette 2 and a second fraction of the fluid termed filtrate passes through the membrane of each cassette 2 and flows perpendicularly to the retentate, then the filtrate and the retentate exit the cassette 2, respectively via filtrate and retentate outlet conduits 12 and 13.

It is thus possible to retrieve different fractions of treated fluid, for example the filtrate or the retentate, depending on the type of application.

It is to be noted that the cassettes 2 have identical opposite faces, with the same conduits of fluid to treat 11, filtrate 12 and retentate 13 on each of those faces (FIG. 1).

The manifold 3 providing fluid connection and mechanical connection has a substantially parallelepiped shape and is provided with a mechanical part of stainless steel and a fluidic part of plastics material, the mechanical part comprising a space to receive the fluidic part.

This manifold 3 comprises two cheeks 14 each having two wings 15 facing each other and a lateral wall linking the two wings 15.

The height of the cheeks 14 is at least equivalent to that of the manifold 3, and the space between the two wings 15 of each cheek 14 is equivalent to the depth of that fluidic part for its introduction by sliding into the space of the mechanical part of that manifold 3.

When the fluidic part is inserted into that space, an upper wall 16 is placed on the upper face of the fluidic part of the manifold 3, then screwed by four fixing screws 17 inserted into the mechanical part of the manifold 3.

In the upper face of the fluidic part of the manifold 3 are formed a flow inlet 18 for the fluid to treat, a filtrate flow outlet 19 and a retentate flow outlet 20.

Around each inlet and outlets 18 to 20, are formed respective annular grooves (not shown) adapted to receive seals (not shown) and pipes, for example rigid stainless steel or flexible plastic pipes, for conveying the fluids to or from other parts of the treatment installation.

The fastening of the pipes onto these inlets and outlets 18 to 20 is provided by linking units 21 mounted on the upper wall 16.

This manifold 3 is also provided with a lower face in which are formed a flow inlet and flow outlets similar to those on the upper face as well as the same annular grooves and the same fastening units mounted on a lower wall (not shown).

If it is wished to block off one of these inlets and/or outlets, it suffices to insert a plug the annular rim of which is introduced into one of those annular grooves.

The flow inlet 18, the filtrate flow outlet 19 and the retentate flow outlet 20 respectively belong to a flow inlet conduit for the fluid to treat, to a filtrate flow outlet conduit and to a retentate flow outlet conduit of the manifold 3.

These conduits are formed by machining, and in particular by boring the fluidic part of plastics material of the manifold 3, at least over a major portion of its height.

Manifold 3 further comprises on its first side a first bearing surface 22 against which a filter cassette 2 comes to bear.

On this first bearing surface 22 emerge cassette feed ports for the fluid to treat, cassette filtrate return ports and cassette retentate return ports (not shown), each of these ports moreover emerging respectively into the flow inlet conduit, into the filtrate flow outlet and into the retentate flow outlet conduit.

Manifold 3 further comprises on its second side a second bearing surface 23 against which a dummy filter cassette 26 comes to bear.

No port emerges on that second bearing surface 23.

The manifold 3 providing fluid connection and mechanical connection rests on a supporting plate 24 onto which it is fastened by fastening screws 25. This supporting plate 24 is adapted to be mounted in the treatment installation, for example on a cart of that installation.

On each of the first and second sides of the manifold 3 providing fluid connection and mechanical connection, the four rods 5, 35 for holding and guiding the filter cassettes 2 are screwed at one end, respectively in pairs, in the respective wings 15.

The two respective holding and guiding rods 5 and 35 which project from each wing 15 of the manifold 3 are superposed such that, respectively, the set of filter cassettes 2 and the dummy cassette 26 may be held by those respective rods 5, 35.

For this, each filter cassette 2 comprises on respective opposite sides of its width, at the bottom, a semi-annular recess 27 having a shape complementary to the shape of the rod 5 which projects from the bottom of the cheek 14, and, at the top, a lug 28 which rests on the rod 5 that projects from the top of the lateral wall.

Naturally, the dummy cassette 26 is provided with the same lugs and recesses as the filter cassettes 2.

Those rods 5, 35 for holding and guiding the filter cassettes 2 and the dummy cassette 26 are smooth so that those cassettes 2, 26 may easily slide on those rods 5, 35.

From the first and second side of the manifold 3, each rod 8, 38 for supporting the respective plate 4, 34 is screwed by a proximal end into a respective cheek 14 of the manifold 3 and at the other, distal, end of the manifold 3 comprises respective abutment means 29, 33 each formed by a washer and a nut.

On each of the smooth rods 8, 38 for supporting the respective plate 4, 34 are movably mounted respective mounting means 9, 39 for each plate 4, 34.

Each mounting means 9, 39 has the form of a ring provided with a central aperture passed through by a respective rod 8, 38 to form a slide.

Each mounting means 9, 39 is thus free to slide on the respective rod 8, 38 between the manifold 3 and the respective abutment 29, 33.

Each mounting means 9, 39 further comprises a rotational shaft 40 inserted into an aperture passing radially through that mounting means 9, 39 to form a hinge.

Each plate 4, 34 comprises two feet 41 each mounted on a rotational shaft 40 of the respective mounting means 9, 39 for the pivoting of that respective plate 4, 34.

Each plate 4, 34 is capable of passing very simply from a storage configuration to a working configuration as will be described below.

Each mounting means 9, 39 further comprises a protuberance 42 passed through by an aperture in which is inserted an abutment pin 43 for the respective clamping plate 4, 34.

Each pin 43 enables the respective plate 4, 34 to be horizontal in its storage configuration.

The manifold 3 has a third side and a fourth side that is an opposite side to the third side, and which are formed by the cheeks 14, and the device comprises a casing 50 fastened to each of those cheeks 14, via fastening screws 51.

In the example described, each casing 50 is slightly offset towards the second side of the manifold 3 providing fluid connection and mechanical connection.

Each casing 50 comprises two actuators 10, of which one acts on the first side of the manifold 3 and the other acts on the second side of the manifold 3, as described below.

Figure 2:
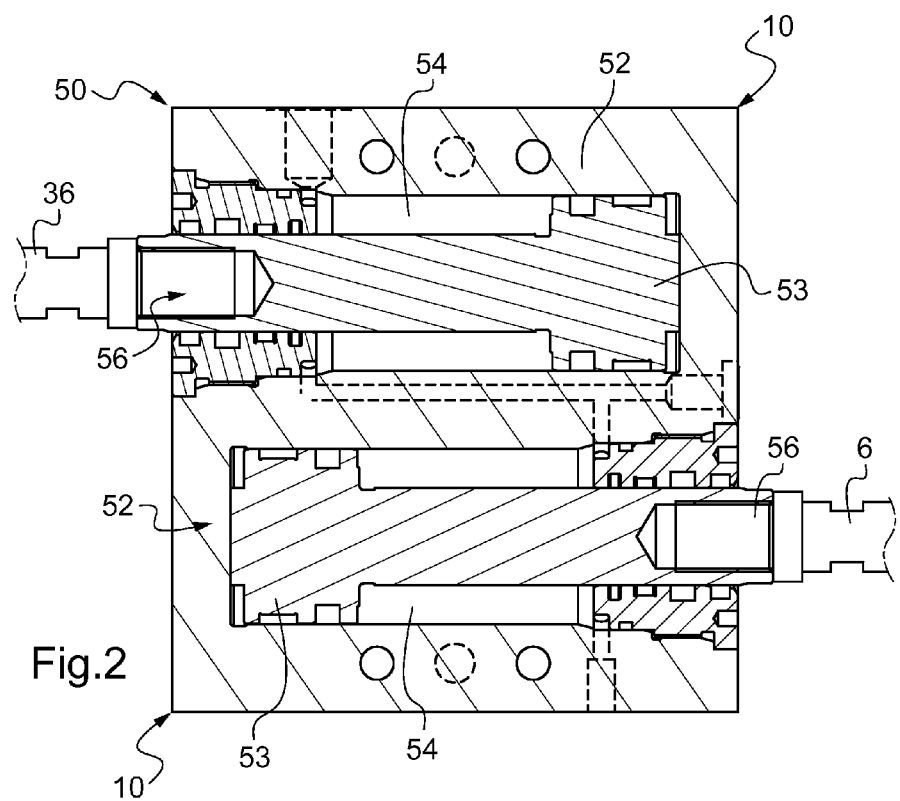
FIG. 2 is the section view on II-II of FIG. 1.

FIG. 2 more particularly shows the casing 50 of the third side of the manifold 3, where each actuator 10 comprises a body 52 which comprises a chamber 54, a moveable piston 53 extended by a rod, that piston 53 having an extended position and a retracted position in which the moveable piston is moved through a predetermined travel relative to its extended position.

The actuators 10 are illustrated in retracted position in FIG. 2.

The actuators 10 here are double-acting hydraulic jacks disposed in parallel. For their supply, each casing 50 comprises two hydraulic connectors 55 (FIG. 1).

One of the connectors 55 enables a liquid under pressure to be sent into a first portion of the chamber 54, so as to urge the moveable piston 53 to its extended position where it is at end of travel.

The other connector 55 enables a liquid under pressure to be sent into a second portion of the chamber 54, this second portion being opposed to the first portion, to urge the moveable piston 53 to the other end of travel position, in its retracted position.

As can also be seen in FIG. 2, the actuators 10 provided for driving the clamping plates 4 and 34 are in superposed disposition in pairs in the respective casing 50.

Thus, the bulk of the device 1 may be extremely reduced on account of this arrangement.

As can be seen again in FIG. 2, the notched rods 6 and 36 are screwed at one end into a respective recess 56 provided in a rod which extends the respective moveable piston 53, the moveable piston 53 of the bottom actuator 10 driving the rod 6 extending from the first side of the manifold 3, and the moveable piston 53 of the top actuator 10 driving the notched rod 36 of the second side of the manifold 3.

In the casing 50 of the fourth side of the manifold 3, the top actuator is linked via the rod extending its moveable piston to the rod 6 which extends from the first side of the manifold 3, and the bottom actuator is linked via the rod which extends its moveable piston to the rod 36 which extends from the second side of the manifold 3.

As is particularly visible in FIG. 1, on the first and second sides of the manifold 3 providing fluid connection and mechanical connection where filter cassettes 2 and the dummy cassette 26 are respectively disposed, the respective notched rods 6 and 36 are diagonally oppositely disposed.

Each notched rod 6 and 36 has notches 30 regularly spaced over its length.

The length of the notches depends on the type of filter cassettes 2 used and the spacing of those notches depends on the travel of the moveable piston 53 in the body 54 of the actuator 10, on the type and number of filter cassettes 2, and on the degree of compression that each filter cassette 2 can allow.

The clamping plates 4 and 34 each comprise four first through holes 31 provided to receive the respective holding and guiding rods 5 and 35.

The clamping plates 4 and 34 further comprise two second through holes 32 in diagonally opposite disposition and provided to receive the respective notched rods 6 and 36.

In the example described, the rods 5, 6 and 8 and 35, 36 and 38 that respectively extend from the first side and from the second side of the manifold 3 differ moreover in their lengths, the rods of the first side being longer than the rods of the second side.

In a first step, the user installs the filter cassettes 2 on the rods 5, on the first side of the manifold 3 providing fluid connection and mechanical connection and installs the dummy cassette 26 on the second side of the manifold 3.

During this step, the respective clamping plates 4 and 34 are in their storage configuration, that is to say that the respective mounting means 9, 39 are in proximity to the manifold 3 and the plates 4 and 34 are respectively horizontal to be moved under the respective supporting rods 8 and 38.

Once the set of filter cassettes 2 and the dummy cassette 26 have been installed, the respective clamping plates 4 and 34 are moved by sliding towards the respective abutments 29 and 33 of the respective rods 8 and 38, then each clamping plate 4, 34 is raised parallel to and facing the bearing surface 22, 23 to bring it into its working configuration.

The clamping plates 4 and 34 are then in their starting position in which they are respectively away from the set of filter cassettes 2 and away from the dummy cassette 26.

Next, the clamping plate 4 is moved by sliding of the mounting means 9 on each of the rods 8 until it is in non-clamping abutment against the filter cassette 2 that is the furthest from the manifold 3.

The clamping plate is thus in an intermediate position in which its principal internal surface 45 is situated in abutment against the filter cassette 2.

In parallel, the clamping plate 34 is moved by sliding of the mounting means 39 on the rods 38 to an intermediate position of that clamping plate 34 in which it is in non-clamping abutment against the dummy cassette 26.

At that instant, each actuator 10 has its respective moveable piston 53 in the extended position.

The locking members 7 and 37 are then mounted on the notches 30 situated in immediate proximity to the respective clamping plates 4 and 34, on the opposite side respectively to the set of filter cassettes 2 and the dummy cassette 26.

These locking members 7 and 37 have the form of a split ring, the splits creating sufficient spacing for each ring 7, 37 to be mounted on the respective rod 6, 36 at the location of a notch 30, and have an appropriate thickness to remain in place at the location of that notch 30.

Each locking member 7, 37 is thus fastened onto its respective rod 6, 36, and the respective clamping plate 4, 34 thus faces an abutment respectively formed by those members 7, 37.

The moveable pistons 53 of the actuators 10 are then urged towards their retracted position.

These moveable pistons 53 thus drive the rods 6, 36, and consequently the plates 4 and 34 which are locked via the locking members 7, 37 to prevent sliding on those rods, to the clamped positions of the clamping plates 4 and 34 in which those clamping plates 4 and 34 respectively compress the set of filter cassettes 2 against the first bearing surface 22 of the manifold 3, and the dummy cassette 26 against the second bearing surface 23 of the manifold 3.

In these clamped positions of the clamping plates 4 and 34, the moveable pistons 53 of the respective actuators 10 are in an intermediate retracted position in which each moveable piston 53 has moved through a shorter travel than the predetermined travel relative to its extended position.

The use of a dummy cassette 26 on the second side of the manifold 3, where there are no real filter cassettes, advantageously makes it possible to perform even clamping of the whole set of cassettes on the filtration device 1, and thus to improve the quality of the treatment performed.

To remove the set of filter cassettes 2 and/or the dummy cassette 26, operation is conducted in the opposite direction by urging the moveable pistons 53 towards their extended position so as no longer to place the set of filter cassettes 2 and the cassette 26 under compression by separation of the respective clamping plates 4 and 34, then the locking members 7 and 37 are removed, then the clamping plates 4 and 34 are moved to their abutments 29 and 33 by sliding of the mounting means 9 and 39 on the respective rods 8 and 38.

The user may also clean the device 1 and fold down the respective plates 4, 34 to put them into their storage configuration.

The user may also clean the device 1, and in particular the manifold 3 and the set of cassettes 2, while leaving that set of cassettes 2 compressed.

Figure 5:
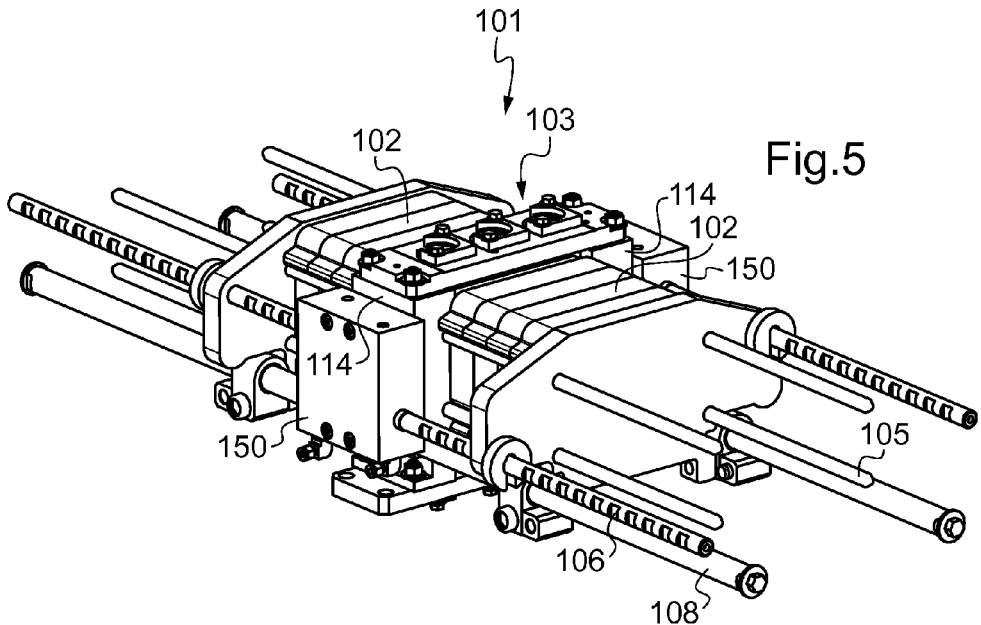
FIG. 5 is a perspective view of a device according to a second embodiment of the invention, with the clamping plate in clamped position.

FIG. 5 illustrates a second embodiment of the filtration device.

Generally speaking, the same reference numbers are used for similar parts but increased by 100.

In contrast with the filtration device 1 illustrated in FIGS. 1 to 4, the filtration device 101 illustrated in FIG. 5 comprises, on the first and second sides of the manifold 103 providing fluid connection and mechanical connection, a set of filter cassettes 102 such that the filtration area is increased.

There is thus no longer any dummy cassette in this embodiment.

The casings 150 comprising the actuators are fastened centrally on the respective cheeks 114, rather than being offset towards the second side of the manifold 103.

The first and second sides of the manifold 103 are thus mirror images of each other.

This means that the supporting rods 108, the holding and guiding rods 105 and the notched rods 106 are to be found on both those first and second sides of the manifold 103, those rods having the same length.

The putting into place of the cassettes 102 and the clamping operations thereof are carried out in the same way as described earlier.

Figure 6:
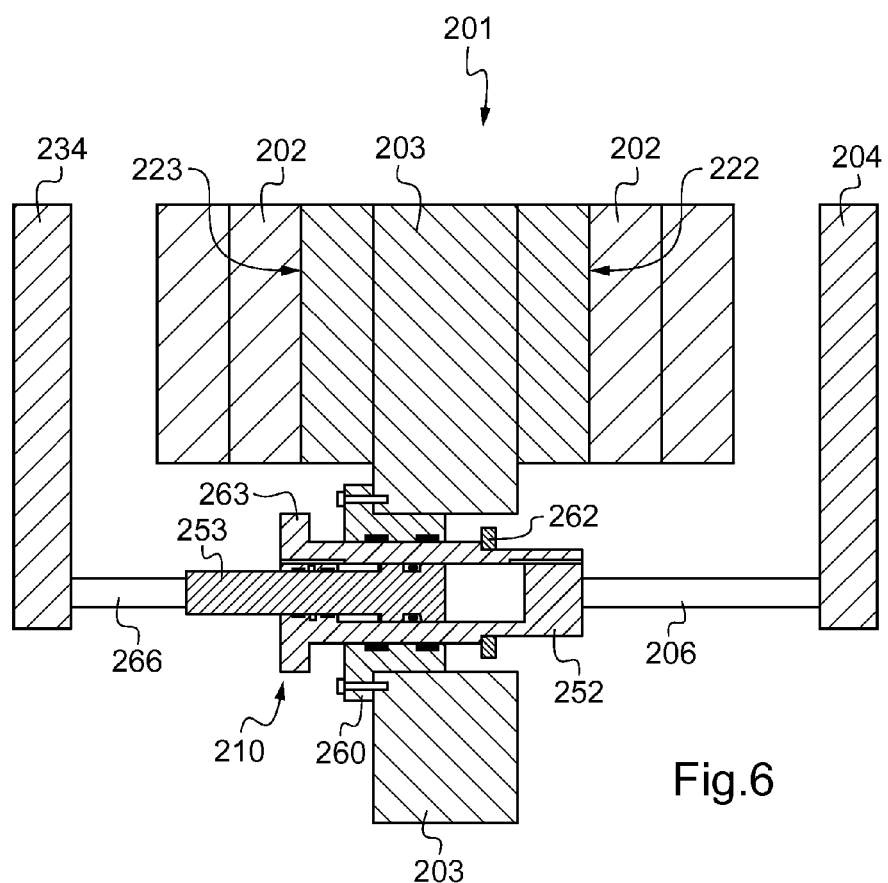
FIG. 6 is a diagrammatic view of a device according to a third embodiment of the invention.

FIG. 6 illustrates a third embodiment of the filtration device.

Generally speaking, for similar parts the same reference numbers have been used as for the first embodiment, but increased by 200.

In contrast to the filtration device 101 illustrated in FIG. 5, the filtration device 201 illustrated in FIG. 6 comprises a so-called floating actuator 210.

This actuator 210 is moveably mounted in a sleeve 260 fastened to the third side of the manifold 203 providing fluid connection and mechanical connection.

The actuator 210 comprises a body 252 moveably mounted in the sleeve 260 and a piston 253 moveable relative to that body 252.

The body 252 further comprises abutments 262 and 263 disposed on respective opposite sides of the sleeve 260 to determine the travel of that actuator 210.

A notched rod 206 is fastened by a first end to the body 252 of the actuator 210 and linked by a second end, that is an opposite end to the first end, to the clamping plate 204 on the first side of the manifold 203.

An additional notched rod 266 is fastened by a first end to the moveable piston 253 of the actuator and linked by a second end, that is an opposite end to the first end, to the clamping plate 234 on the second side of the manifold 203.

In this case, the body 252 drives the notched rod 206 which drives the clamping plate 204 to its clamped position in which it compresses the set of filter cassettes 202 against the first bearing surface 222 of the manifold 203, and the moveable piston 253 drives the additional notched rod 266 which drives the clamping plate 234 to its clamped position in which it compresses the set of filter cassettes 202 against the second bearing surface 223 of the manifold 203.

In the example described, a single actuator 210 is represented on the third side of the manifold 203 providing fluid connection and mechanical connection.

In a variant not illustrated, the filtration device comprises an actuator 210 arranged on each of the third and fourth sides of the manifold 203 providing fluid connection and mechanical connection.

In still other variants not illustrated:

the fluidic part of the manifold is of stainless steel rather than of plastics material;

the mechanical part of the manifold is of plastics material rather than of stainless steel;

the mechanical and fluidic parts of the manifold are of plastics material, for example of polysulfone (PSU) or of polyoxymethylene (POM);

only one clamping plate is provided;

the actuator body or bodies is or are of an extent in terms of length which does not superpose over the extent of the manifold in terms of thickness, for example by being fastened to the manifold by one end;

the hydraulic actuators are replaced by single or double acting pneumatic actuators, or are of a nature other than fluidic, for example electrical;

the filter cassettes do not comprise lugs but are provided with several additional recesses, and these cassettes are for example of Pellicon® type, available from the Millipore company;

the clamping plate is removable rather than being linked to the supporting rod by a mounting means mounted on that supporting rod;

the manifold is formed by molding rather than by machining, with its flow inlets, flow outlets, conduits, cassette feed ports, cassette filtrate return ports, and cassette retentate return ports being formed by injection molding;

the filtration device uses two filtrate flow outlet ports, one on the upper face and the other on the lower face, and the case arising one of the two filtrate outlet ports serves as a drain;

only two rods for holding and guiding the set of cassettes are disposed on at least one of the first and second sides of the manifold providing fluid connection and mechanical connection;

it is not tangential filtration that is carried out but for example dead-end filtration for which a set of at least one cassette of POD® type is used, available from the Millipore company, or else viral filtration for which a set of at least one cassette is used of MAGNUS® type, available from the Millipore company.

In still another variant not illustrated, the treatment installation comprises several filtration devices as described above which are superposed, the set of filter cassettes on at least one side of the manifold providing fluid connection for each filtration device. It is thus necessary to connect several manifolds at the flow inlets and outlets. These assemblies require sealing means at each junction between two manifolds, at the location of the grooves formed around those inlets and/or outlets.

It is thus possible to adapt the filtration surface very simply to meet the needs of that treatment installation.

It should be noted more generally that the invention is not limited to the examples described and represented.

The invention claimed is:

1. A device for filtration with a set of at least one filter cassette comprising:
    a manifold having a substantially parallelepiped shape and providing fluid connection and mechanical connection comprising at least one flow inlet for a fluid to treat, at least one flow outlet for a treated fluid and a network for conveying said fluid to treat and said treated fluid, said manifold comprising two bearing surfaces arranged on respective opposite sides of said manifold; said manifold further comprising at least one lateral side and an upper face and a lower face opposite said upper face, wherein said at least one flow inlet and said at least one flow outlet are formed in at least one of said upper face and lower face;
    two clamping plates each facing a respective bearing surface, through which bearing surfaces emerge cassette feed ports and cassette return ports communicating with said network for conveying, which cassette feed ports and cassette return ports are configured to communicate with conduits formed in a said filter cassette bearing against said bearing surfaces; and
    at least one guiding rod which extends between said manifold and said clamping plates and at least one actuator, which is provided with a body and a member moveable relative to said body, which moveable member has an extended position and a retracted position in which said moveable member has been moved through a predetermined travel relative to its extended position, by virtue of which the clamping plates have a starting position in which said plates are away from said set of at least one filter cassette and a clamped position in which said plates are approached and compresses said set of at least one filter cassette against said manifold; said body of said at least one actuator being mounted on said at least one lateral side;
    wherein said body is carried by said manifold; said moveable member carries said guiding rod; and said actuator, said guiding rod and said clamping plates are configured such that said actuator drives said clamping plates via said guiding rod to their clamped position in which said moveable member is in an intermediate retracted position in which said moveable member has moved through a shorter travel than said predetermined travel relative to its extended position;
    wherein said body of said actuator is movably mounted in a sleeve fixed to said manifold.

2. A device according to claim 1, wherein said guiding rod and said clamping plates are configured such that said clamping plates can be selectively positioned along said guiding rod.

3. A device according to claim 1, comprising two said actuators and two said guiding rods, each said guiding rod being received by a clamping plate in two diagonally opposite zones of said clamping plate.

4. A device according to claim 1, further comprising at least one additional rod extending between said body of said actuator and the other of the two said clamping plates, said additional rod being carried by a first end by said body and, by a second end that is an opposite end to the first end, carrying the other of the two said clamping plates.

5. A device according to claim 1, wherein said guiding rod comprises a plurality of notches over its length.

6. A device according to claim 5, further comprising a member for locking each said clamping plate onto a notch of said rod.

7. A device according to claim 1, further comprising at least one holding and guiding rod for holding and guiding said set of at least one filter cassette which is carried by said manifold and which extends through at least one aperture formed in each said clamping plate.

8. A device according to claim 1, wherein said device comprises at least one supporting rod for supporting said clamping plate which is carried by said manifold.

9. A device according to claim 8, further comprising a slide and a hinge, by virtue of which each said clamping plate is slidingly moveable along the supporting rod and has a working configuration in which it is raised parallel to and facing said bearing surface and a stored configuration in which it is folded down and clear of said guiding rod.

10. A device for filtration with a set of at least one filter cassette comprising:
    a manifold having a substantially parallelepiped shape and providing fluid connection and mechanical connection comprising at least one flow inlet for a fluid to treat, at least one flow outlet for a treated fluid and a network for conveying said fluid to treat and said treated fluid, said manifold comprising two bearing surfaces arranged on respective opposite sides of said manifold; said manifold further comprising at least one lateral side and an upper face and a lower face opposite said upper face, wherein said at least one flow inlet and said at least one flow outlet are formed in at least one of said upper face and lower face;
    two clamping plates each facing a respective bearing surface, through which bearing surfaces emerge cassette feed ports and cassette return ports communicating with said network for conveying, which cassette feed ports and cassette return ports are configured to communicate with conduits formed in a said filter cassette bearing against said bearing surfaces; and
    at least one guiding rod which extends between said manifold and said clamping plates and at least one actuator, which is provided with a body and a member moveable relative to said body, which moveable member has an extended position and a retracted position in which said moveable member has been moved through a predetermined travel relative to its extended position, by virtue of which the clamping plates have a starting position in which said plates are away from said set of at least one filter cassette and a clamped position in which said plates are approached and compresses said set of at least one filter cassette against said manifold; said body of said at least one actuator being mounted on said at least one lateral side;

wherein said body is carried by said manifold; said moveable member carries said guiding rod; and said actuator, said guiding rod and said clamping plates are configured such that said actuator drives said clamping plates via said guiding rod to their clamped position in which said moveable member is in an intermediate retracted position in which said moveable member has moved through a shorter travel than said predetermined travel relative to its extended position;

said device further comprising at least one supporting rod for supporting said clamping plate which is carried by said manifold, and a slide and a hinge, by virtue of which each said clamping plate is slidingly moveable along the supporting rod and has a working configuration in which it is raised parallel to and facing said bearing surface and a stored configuration in which it is folded down and clear of said guiding rod.

\* \* \* \* \*